(12) United States Patent
Venkatachalam Jayaraman et al.

(10) Patent No.: US 9,350,676 B2
(45) Date of Patent: May 24, 2016

(54) METHOD AND APPARATUS FOR CLASSIFYING FLOWS FOR COMPRESSION

(71) Applicant: QUALCOMM Incorporated, San Diego, CA (US)

(72) Inventors: Venkata Ramanan Venkatachalam Jayaraman, Del Mar, CA (US); Rohit Kapoor, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 14/084,272

(22) Filed: Nov. 19, 2013

(65) Prior Publication Data

US 2014/0160932 A1    Jun. 12, 2014

Related U.S. Application Data

(60) Provisional application No. 61/735,807, filed on Dec. 11, 2012.

(51) Int. Cl.
*G01R 31/08* (2006.01)
*H04L 12/851* (2013.01)
(Continued)

(52) U.S. Cl.
CPC ............ *H04L 47/2441* (2013.01); *H04L 67/04* (2013.01); *H04L 69/04* (2013.01); *H04W 28/06* (2013.01)

(58) Field of Classification Search
CPC .................................................. H04L 47/2441
USPC ........................................................ 370/235
See application file for complete search history.

(56) References Cited

U.S. PATENT DOCUMENTS 6,121,903 A    9/2000    Kalkstein
6,598,074 B1   7/2003    Moller et al.
(Continued)

FOREIGN PATENT DOCUMENTS

WO    WO 99/67886 A1    12/1999
WO    WO-2004054202 A1   6/2004
(Continued)

OTHER PUBLICATIONS

International Search Report and Written Opinion—PCT/US2013/071449—ISA/EPO—Apr. 3, 2014, 9 pages.
(Continued)

*Primary Examiner* — Gerald Smarth
(74) *Attorney, Agent, or Firm* — Arent Fox LLP

(57) ABSTRACT

Methods and apparatus for wireless communication include receiving, at a compressor component, a data packet flow and determining information associated with the data packet flow from one or more data packets associated with the data packet flow. The determined information includes source or destination information corresponding to the one or more data packets of the data packet flow. Further, the methods and apparatus include classifying the data packet flow as a compressible or an uncompressed data packet flow based on the determined information, and compressing or skipping compressing of the one or more data packets associated with the data packet flow based on the classification of the data packet flow. Additionally, the methods and apparatus include transmitting the one or more compressed or uncompressed data packets depending on the classification of the data packet flow.

22 Claims, 9 Drawing Sheets

(51) Int. Cl.
*H04L 29/06* (2006.01)
*H04W 28/06* (2009.01)
*H04L 29/08* (2006.01)

(56) References Cited

U.S. PATENT DOCUMENTS

| | | | |
|---|---|---|---|
| 6,745,012 | B1 | 6/2004 | Ton et al. |
| 7,420,992 | B1 * | 9/2008 | Fang et al. ............... 370/477 |
| 7,447,814 | B1 | 11/2008 | Ekman |
| 2002/0085631 | A1 | 7/2002 | Engwer |
| 2004/0071096 | A1 * | 4/2004 | Na ..................... H04L 1/0029 370/252 |
| 2005/0210151 | A1 | 9/2005 | Abdo et al. |
| 2006/0104278 | A1 * | 5/2006 | Chang et al. ............... 370/392 |
| 2007/0115964 | A1 | 5/2007 | Srinivasan et al. |
| 2007/0153764 | A1 | 7/2007 | Thubert et al. |
| 2007/0189278 | A1 | 8/2007 | Tu et al. |
| 2008/0025298 | A1 | 1/2008 | Lev-Ran et al. |
| 2008/0101220 | A1 | 5/2008 | Kim et al. |
| 2009/0161547 | A1 * | 6/2009 | Riddle et al. ............... 370/236 |
| 2009/0245382 | A1 | 10/2009 | Ekman |
| 2010/0067545 | A1 * | 3/2010 | Hata et al. ............... 370/465 |
| 2010/0124239 | A1 | 5/2010 | Hughes |
| 2010/0195639 | A1 * | 8/2010 | Song ..................... H04H 20/57 370/349 |
| 2011/0019552 | A1 * | 1/2011 | Karaoguz et al. ............. 370/236 |
| 2011/0289263 | A1 * | 11/2011 | McWilliams ....... G06F 12/0284 711/103 |
| 2012/0030736 | A1 | 2/2012 | Resch et al. |
| 2012/0243551 | A1 | 9/2012 | Afek et al. |
| 2012/0254417 | A1 * | 10/2012 | Luna ................... H04L 67/2828 709/224 |
| 2012/0327956 | A1 | 12/2012 | Vasudevan |
| 2013/0007346 | A1 | 1/2013 | Khan |
| 2013/0039487 | A1 | 2/2013 | McGrew |
| 2013/0077486 | A1 * | 3/2013 | Keith ................... H04L 47/2433 370/230.1 |

FOREIGN PATENT DOCUMENTS

| | | |
|---|---|---|
| WO | WO-2004072763 A2 | 8/2004 |
| WO | WO 2012/015389 A1 | 2/2012 |

OTHER PUBLICATIONS

Co-pending U.S. Appl. No. 13/960,583, filed Aug. 6, 2013.
Co-pending U.S. Appl. No. 14/067,703, filed Oct. 30, 2013.
Co-pending U.S. Appl. No. 14/099,478, filed Dec. 6, 2013.

* cited by examiner

METHOD AND APPARATUS FOR CLASSIFYING FLOWS FOR COMPRESSION

CLAIM OF PRIORITY UNDER 35 U.S.C §119

The present Application for Patent claims priority to U.S. Provisional Application No. 61/735,807 entitled "METHOD AND APPARATUS FOR CLASSIFYING FLOWS FOR COMPRESSION" filed Dec. 11, 2012, and assigned to the assignee hereof and hereby expressly incorporated by reference.

REFERENCE TO CO-PENDING APPLICATIONS FOR PATENT

The present Application for Patent is related to the following co-pending U.S. patent applications:

Application Ser. No. 13/960,583, entitled "METHOD AND APPARATUS FOR A MEMORY BASED PACKET COMPRESSION ENCODING", filed Aug. 6, 2013, assigned to the assignee hereof, and expressly incorporated by reference herein;

Application Ser. No. 14/067,703, entitled "METHOD AND APPARATUS FOR EFFICIENT SIGNALING FOR COMPRESSION", filed Oct. 30, 2013, assigned to the assignee hereof and hereby expressly incorporated by reference; and Application Ser. No. 14/099,703, entitled "METHOD AND APPARATUS FOR DISABLING COMPRESSION FOR INCOMPRESSIBLE FLOWS", filed Dec. 6, 2013, assigned to the assignee hereof, and expressly incorporated by reference herein.

BACKGROUND

Aspects of the present disclosure relate generally to wireless communication systems, and more particularly, to an apparatus and method for improving the mechanism for classifying and identifying data packet flows for compression, thereby providing consistent service in a wireless communication system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless communications systems, a compressor may be used to compress data packet flows. In doing so, the algorithm for compression may attempt to compress certain data packets from the data packet flows that may not need to be or may not be able to be further compressed, such as encrypted traffic or video. As such, the compressor and decompressor may needlessly spend processing resources on trying to compress or decompress certain data packets that provide little or no reduction in packet size.

Thus, improvements in the operations associated with compressing data packet flows are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication includes receiving, at a compressor component, a data packet flow and determining information associated with the data packet flow from one or more data packets associated with the data packet flow. For instance, the determined information includes source information or destination information corresponding to the one or more data packets of the data packet flow. Further, the method includes classifying the data packet flow as a compressible data packet flow or an uncompressed data packet flow based on the determined information. Also, the method includes compressing the one or more data packets associated with the data packet flow to produce one or more compressed data packets for transmission when the data packet flow is classified as the compressible data packet flow. Additionally, the method includes transmitting the one or more compressed data packets when the data packet flow is classified as the compressible data packet flow or transmitting the one or more data packets when the data packet flow is classified as the uncompressed data packet flow.

In another aspect, an apparatus of wireless communication comprises a compressor component having a receiver component configured to receive a data packet flow and a flow information determiner component configured to determine information associated with the data packet flow from one or more data packets associated with the data packet flow. The determined information includes source information or destination information corresponding to the one or more data packets of the data packet flow. Further, the apparatus or compressor component includes a classifier component configured to classify the data packet flow as a compressible data packet flow or an uncompressed data packet flow based on the determined information. Also, the apparatus or compressor component includes a compressor configured to compress the one or more data packets associated with the data packet flow to produce one or more compressed data packets for transmission when the data packet flow is classified as the compressible data packet flow. Additionally, the apparatus or compressor component includes an output component configured to transmit the one or more compressed data packets when the data packet flow is classified as the compressible data packet flow or transmitting the one or more data packets when the data packet flow is classified as the uncompressed data packet flow.

In a further aspect, an apparatus including a compressor component for wireless communication includes means for receiving a data packet flow and means for determining information associated with the data packet flow from one or more data packets associated with the data packet flow. The determined information includes source information or destination information corresponding to the one or more data packets of the data packet flow. Also, the apparatus includes means for classifying the data packet flow as a compressible data packet flow or an uncompressed data packet flow based on the determined information. Further, the apparatus includes means for compressing the one or more data packets associated with the data packet flow to produce one or more compressed data packets for transmission when the data packet flow is classified as the compressible data packet flow. Additionally, the apparatus includes means for transmitting the one or more compressed data packets when the data packet flow is classified as the compressible data packet flow or transmitting the one or more data packets when the data packet flow is classified as the uncompressed data packet flow.

Moreover, in another aspect, a non-transitory computer readable medium includes code executable by a computer for receiving, at a compressor component, a data packet flow, and code executable by the computer for determining information associated with the data packet flow from one or more data packets associated with the data packet flow. The determined information includes source information or destination information corresponding to the one or more data packets of the data packet flow. Further, the non-transitory computer readable medium includes code executable by the computer for classifying the data packet flow as a compressible data packet flow or an uncompressed data packet flow based on the determined information. Also, the non-transitory computer readable medium includes code executable by the computer for compressing the one or more data packets associated with the data packet flow to produce one or more compressed data packets for transmission when the data packet flow is classified as the compressible data packet flow. Additionally, the non-transitory computer readable medium includes code executable by the computer for transmitting the one or more compressed data packets when the data packet flow is classified as the compressible data packet flow or transmitting the one or more data packets when the data packet flow is classified as the uncompressed data packet flow.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As discussed above, in wireless communication systems prior to the present solution, a compressor component may attempt to compress one or more data packets from a data packet flow for which compression should not be attempted. For example, data packets in flows carrying encrypted traffic or video may not be able to be compressed, or may not achieve a desired reduction in size after compression to warrant the effort of compression. As such, the compressor component (or a corresponding de-compressor component) may end up spending processing resources on trying to compress (or, in the case of the de-compressor component, decompress) certain data packets that provide little or no reduction in packet size.

To mitigate this problem, according to the present aspects, a compressor component (or, de-compressor component) may be configured to classify a data packet flow as a compressible data packet flow or an uncompressed data packet flow based on determined source information or destination information relating to one or more data packets associated with the data packet flow.

Thus, the compressor component (or, de-compressor component) configured according to the present aspects may efficiently classify data flows for applying compression or for skipping compression, which may save processing and memory resources.

Figure 1:
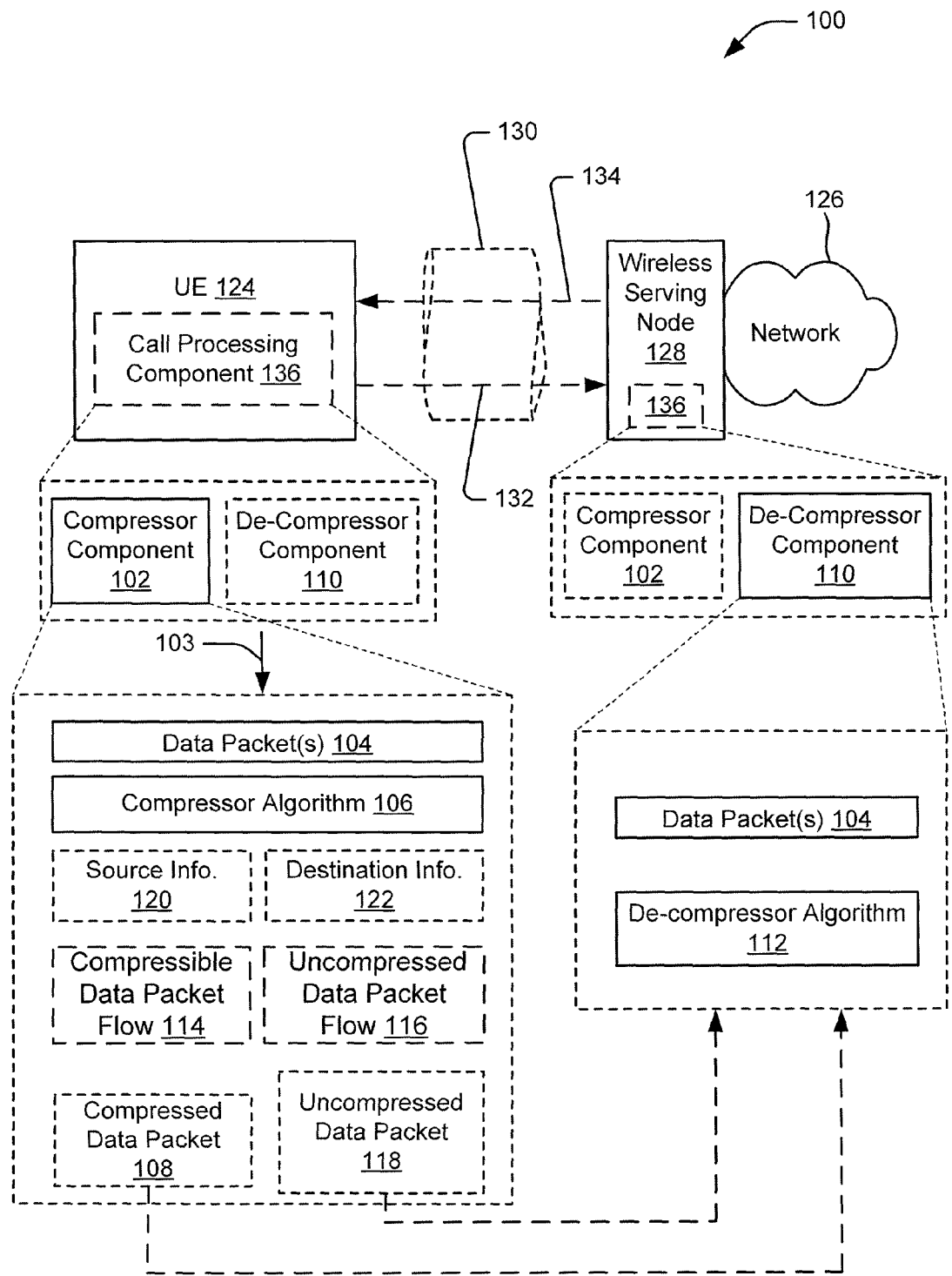
FIG. 1 is a schematic diagram illustrating an example wireless system including an aspect of a call processing component configured to classify a data flow for compression.

Referring to FIG. 1, in one aspect, a wireless communication system 100 includes a compressor component 102 configured to receive a data packet flow 103 including one or more data packets 104, apply a compression algorithm 106 to data packet 104, and generate a compressed data packet 108 for transmission to a de-compressor component 110. De-compressor component 110 is configured to receive compressed data packet 108, apply a de-compression algorithm 112 to compressed data packet 108, and re-generate data packet 104. As noted above, in some cases, it may not be desirable to compress data packet 104. As such, compressor component 102 executing compression algorithm 106 is further configured to classify data packet flow 103 as a compressible data packet flow 114 or an uncompressed data packet flow 116 and, based on the classification, correspondingly determines whether to apply compression to data packet 104. As used herein, the term "uncompressed data packet flow" may mean a data packet flow that is not capable of being compressed, or a data packet flow for which compression is not desirable, such as when a reduction in packet size based on the compression is not suitably greater than an overhead for the compression process. For instance, data packet flows that are encrypted and/or that carry video data may be classified as uncompressed data packet flows. Compressor component 102 executing compression algorithm 106 is configured to determine, for example, information associated with the data packet flow 103 from one or more data packets 104 associated with data packet flow 103. For instance, the determined information may include source information 120 or destination information 122 corresponding to the one or more data packets 104 of data packet flow 103. In some cases, source information 120 or destination information 122 may be obtained based on analyzing a content of the one or more data packets 104, e.g., header information and/or payload information, while in other aspects source information 120 or destination information 122 may be obtained from another device, such as signaled to compressor component 102 from a network entity, including but not limited to a radio access network entity or a core network entity, e.g., via radio resource control (RRC) signaling. As a result of classifying data packet flow 103, compressor component 102 may determine whether or not to apply compression and transmit data packet 104 as compressed current data packet 108 or as uncompressed current data packet 118.

In one example of a possible implementation of the present aspects, which should not be construed as limiting, wireless communication system 100 may include at least one UE 124 that may communicate wirelessly with one or more networks 126 via one or more serving nodes, including, but not limited to, wireless serving node 128, over one or more wireless links 130. The one or more wireless link 130 may include, but are not limited to, signaling radio bearers and/or data radio bearers. UE 124 may be configured to transmit one or more signals 132 to wireless serving node 128 over the one or more wireless link 130, and/or wireless serving node 128 may transmit one or more signals 134 to UE 124. In an aspect, signal 132 and signal 134 may include, but are not limited to, one or more data packet flows including one or more messages or one or more data packets being sent from UE 124 to network 126 via wireless serving node 128, and vice versa.

In an aspect, UE 124 may include compressor component 102 configured to receive data packet flow 103 including one or more data packets 104 destined for another device reachable via network 126, apply compression algorithm 106 to classify data packet flow 103 as compressible data packet flow 114 or uncompressed data packet flow 116, data packet 106, and generate compressed data packet 108 or uncompressed data packet 118 for transmission to wireless serving node 128 and network 126. Correspondingly, wireless serving node 128 and network 126 may include de-compressor component 110 configured to receive the transmitted data packet, apply de-compression algorithm 112 to perform or not perform de-compression operations depending on whether the received data packet was compressed. As a result, de-compression component 110 generates the original data packet 104 for further processing, such as to forward to a destination device, e.g., to generate an output of a voice or data call. In an aspect, compressor component 102 and de-compressor component 110 may include or be implemented in one or more protocol layer entities, such as a Packet Data Convergence Protocol (PDCP) layer entity, although compressor component 102 and de-compressor component 110 may alternatively or additionally include or be implemented by entities at higher or lower layers of a respective protocol stack of UE 124 and wireless serving node 128 or other entities associated with network 126.

Moreover, in an alternative or additional aspect (as illustrated by the dashed line boxes), UE 124 may include de-compressor component 110, and network 126 or wireless serving node 128 may include compressor component 102. In this aspect, network 126 or wireless serving node 128 may operate compressor component 102 for receiving and classifying data packet flow 103 and sending compressed data packet 108 or uncompressed data packet 118 to UE 124, which may operate de-compressor component 110 to analyze the received data packet, optionally de-compress compressed current data packet 108, and generate current data packet 104 for further processing, such as for performing call-related activities.

Further, in an alternative or additional aspect, compressor component 102 and de-compressor component 110 may be part of a call processing component 136 configured to enable a respective device to transmit and/or receive voice and/or data calls, for example, according to one more radio access technology protocols and/or standards.

In these aspects, UE 124 may comprise a mobile apparatus and may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes in these aspects, including, but not limited to, wireless serving node 128 and/or an entity associated with network 126, may include one or more of any type of network component, such as an access point, including a base station or NodeB or eNodeB, a relay, a peer-to-peer device, an authentication, authorization and accounting (AAA) server, a mobile switching center (MSC), a radio network controller (RNC), etc. Further, wireless serving node 128 may include a small cell or small base station, such as, but not limited to a femtocell, picocell, microcell, or any other relatively small coverage or low power base station, as compared to a coverage area or transmit power level of a macro cell or macro base station.

Figure 2:
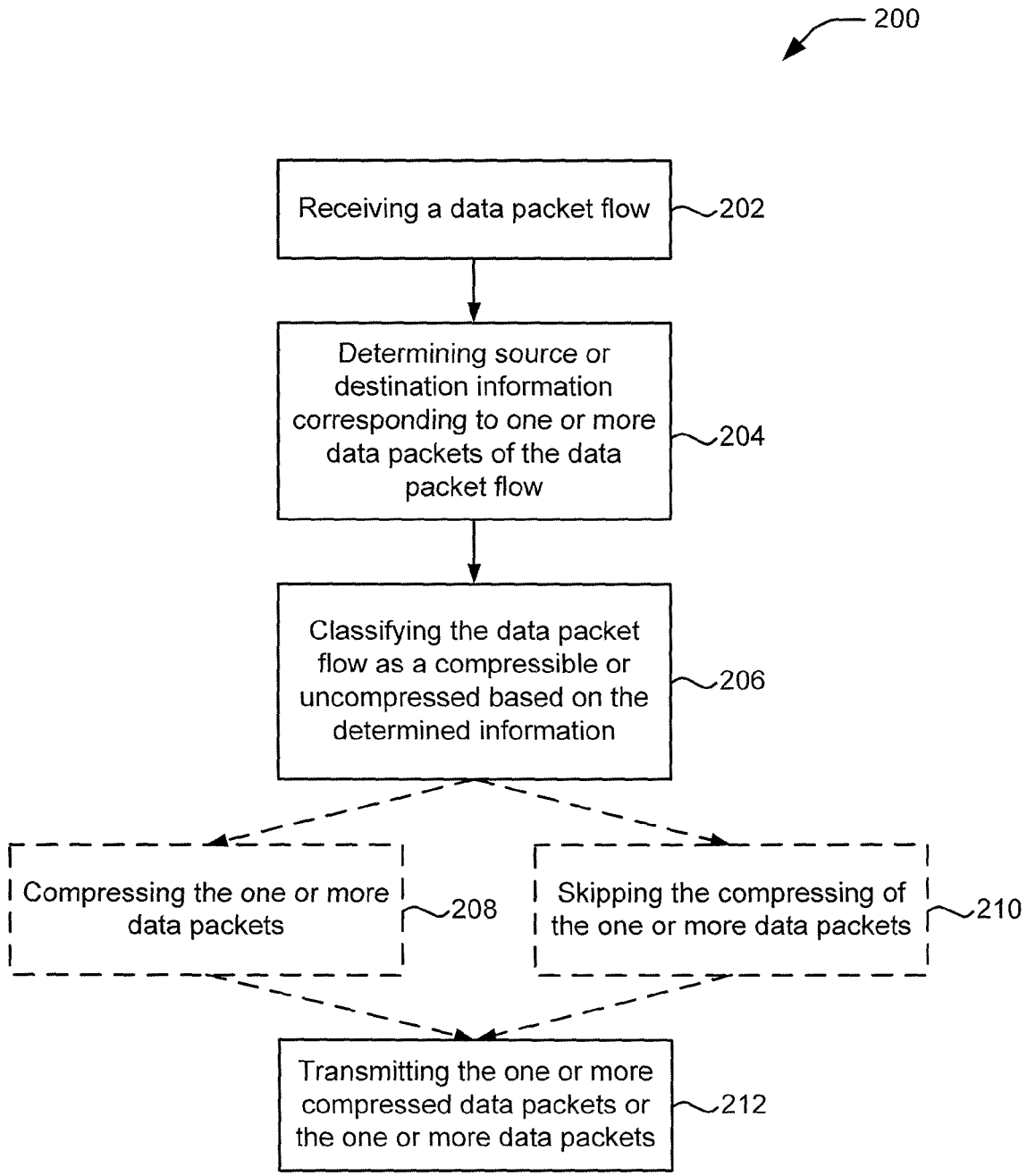
FIG. 2 is a flow diagram illustrating an exemplary method for call processing, including classifying a data flow for compression, in a wireless communication system such as the system of FIG. 1.
Figure 3:
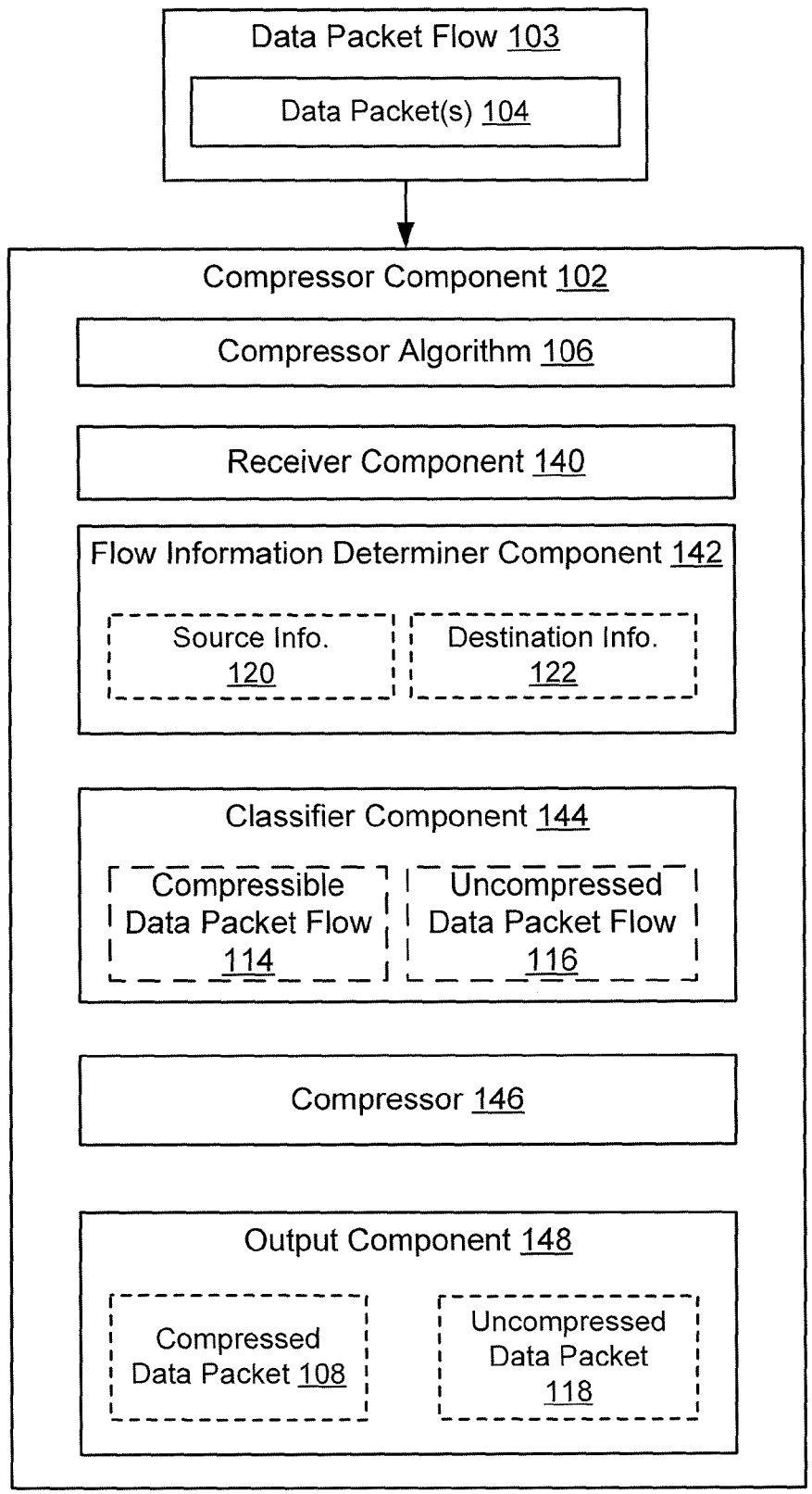
FIG. 3 is a schematic diagram of a more detailed aspect of the compressor component of FIG. 1.

Referring to FIGS. 2 and 3, an example of one or more operations of an aspect of compressor component 102 and/or de-compressor component 110 (FIG. 1) according to the present apparatus and methods are described with reference to one or more methods and one or more components that may perform the actions or functions of these methods. Although the operations described below are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

In a particular aspect, a method 200 of wireless communication includes, at Block 202 (FIG. 2), receiving a data packet flow. In an aspect, for instance, compressor component 102 may include receiver component 140 (FIG. 3) defined by or including an interface to receive data packet flow 103, which may include one or more data packets 104. In an aspect, compressor component 102 may execute compressor algorithm 106 to perform or to skip compression on the one or more data packets 104 associated with one or more data flows, such as data flow 103, based on a classification of the respective data flow. Further, for example, receiver component 140 may be an interface that communicatively connects one protocol layer or protocol layer entity of a protocol stack of a device to another, higher protocol layer or protocol layer entity or to an application executing on the device, which may be, for example, UE 124 or wireless serving node 128, on which compressor component 102 is operating. For instance, data flow 103 may be a logical data flow or a physical data flow that may organize or group data packets for transmission based on one or more parameters, such as but not limited to one or more Quality of Service (QoS) parameters.

At Block 204, an aspect of method 200 may further include determining information associated with the data packet flow from one or more data packets associated with the data packet flow, wherein the determined information comprises source information or destination information corresponding to the one or more data packets of the data packet flow. For example, in an aspect, compressor component 102 may include a flow information determiner component 142 configured to receive data packet flow 103 and one or more data packets 104 from receiver component 140 and analyze a content, such as but not limited to header information, of a respective data packet 104 to identify data packet 104 as being associated with data flow 103, and to further determine information relative to data packet 104 and/or data flow 103 which may be used to determine whether to classify data flow 103 as compressible data flow 114 or uncompressed data flow 116. For instance, flow information determiner component 142 may execute an algorithm, which may be part of compressor algorithm 106, which operates to detect at least one of a port or an address corresponding to data packet 104 and to correlate one or more of a detected port or one or more addresses, or a combination thereof, to a respective data flow. For example, but not limited to this example, current data packet 104 may include information, such as in a header, of a source address, a destination address, a source port, or a destination port. For instance, in some examples, data flows may identified based on the combination of (TCP source port, TCP destination port, IP source address, IP destination address) for TCP based packets, and the combination of (UDP source port, UDP destination port, IP source address, IP destination address) for UDP based packets. In one example, but not limited to this example, to detect at least one of a port or an address corresponding to data packet 104, flow information determiner component 142 may identify data values in a certain position within data packet 104 or may identify certain data values within data packet 104 that correspond to port or address information, e.g., based on a known configuration of such information or based on matching known values. Further, in one example, but not limited to this example, to correlate the detected port or address to a respective data flow, flow information determiner component 142 may correlate the detected port or address to a respective data flow, such as but not limited to based on referencing a table or relational database mapping ports or addresses to data flows.

Moreover, in some aspects, flow information determiner component 142 may gather or otherwise reference determined information, including at least one of source information 120 and destination information 122 corresponding to the one or more data packets 104 of data packet flow 103 for use in classifying data packet flow 103 for compression purposes. Source information 120 and/or destination information 122 may be the same information as noted above, e.g., the information used to identify data flow 103, or source information 120 and/or destination information 122 may be determined based on further analysis of or a known relationship with one or more data packets 104.

For example, in an aspect, flow information determiner component 142 may be configured to determine at least one of a source port or a destination port, while in other aspects, flow information determiner component 142 may be configured to determine at least one of a source address or a destination address. As discussed above, flow information determiner component 142 may identifying this determined information by parsing data within a packet header of the one or more data packets 104.

Also, for example, in an alternative or additional aspect, flow information determiner component 142 may be configured to identify an application associated with the data packet flow based on the source information or the destination information of the one or more data packets corresponding to the application. For instance, in an aspect, flow information determiner component 142 may maintain an association or relationship between one or both of a source address and a destination address and an application that corresponds to the source address and/or the destinations address. As such, at least one of source information 120 and destination information 122 may allow flow information determiner component 142 to determine the corresponding application.

Additionally, for example, flow information determiner component 142 may be configured to identify the application being associated with data packet flow 103 based on receiving an identification of the application as corresponding to the data packet flow. For instance, flow information determiner component 142 may be made aware of the application that is associated with a particular data flow by another entity, such as, but not limited to, by a socket manager that opened a socket for the application or by receiving signaling from a network entity that identifies an application with a data flow.

In another alternative or additional aspect, for example, the identifying of the application being associated with the data packet flow 103 may include analyzing the one or more data packets to determine a packet characteristic, and determining that the packet characteristic corresponds to a certain application that is known to be associated (or not associated) with compressible data. For instance, flow information determiner component 142 may be configured to perform statistical analysis on the one or more data packets 104, or otherwise inspect a content of the one or more data packets 104. For example, but not limited hereto, flow information determiner component 142 may perform statistical analysis on the one or more packets 104, for example, to determine a measure of at least one of packet size, inter-arrival time, or the packet contents. For instance, flow information determiner component 142 may include a table or relational database that associates a relative packet size, relative inter-arrival time, or relative packet contents with, for example, a respective one of a plurality of applications. As such, these factors may provide an indicator of one type of application or another type of application, which then may relate to whether or not the respective packets may or may not be compressible.

In another alternative or additional aspect, for example, the determined source information 120 and/or destination information 122 associated with the data packet flow 103 may be based on analyzing the one or more data packets 104 to determine a packet characteristic, and determining that the packet characteristic corresponds to data known to be compressible data or known to not be compressible data. For instance, flow information determiner component 142 may be configured to perform statistical analysis on the one or more data packets 104, or otherwise inspect a content of the one or more data packets 104. For example, but not limited hereto, flow information determiner component 142 may perform statistical analysis on the one or more packets 104, for example, to determine a measure of at least one of packet size, inter-arrival time, or the packet contents. For instance, flow information determiner component 142 may include a table or relational database that associates a relative packet size, relative inter-arrival time, or relative packet contents with whether or not the data is compressible. For example, but not limited to this example, by inspecting packet contents, flow information determiner component 142 may determine that data flow 103 is carrying HTTP traffic, which could be classified as compressible. Further, for example, by analyzing or otherwise inspecting packet contents, flow information determiner component 142 may determine that data flow 103 is carrying a certain type of traffic, which may then enable a determination of whether or not the traffic could be classified as compressible. For example, flow information determiner component 142 may be configured to identify certain types of data or data at certain positions within the packet contents of the one or more data packets 104, and may be configured to determine whether the identified data matches a known type corresponding to traffic that can be compressible (or not). Thus, determining information associated with the data packet flow includes analyzing the one or more data packets to determine a packet characteristic, and determining the packet characteristic as being associated with sending or receiving compressible data or data not to be compressed.

At Block 206, an aspect of method 200 may further include classifying the data packet flow as a compressible data packet flow or an uncompressed data packet flow based on the determined information. For example, in an aspect, compressor component 102 may include classifier component 144 configured to execute an algorithm, which may be part of compressor algorithm 106, which operates to communicate with flow information determiner component 142 and correlate or otherwise matches the determined information, e.g., including at least one of the source information 120 and the destination information 122, with a known classification of a data flow type. As noted above, compressor component 102 and/or classifier component 144 may maintain a table or database that associates one or more of a source or destination port, a source or destination address, an application, a packet characteristic, or a packet content, all of which may be part of at least one of the source information 120 and the destination information 122, with a respective classification of compressible data flow 114 or uncompressed data flow 116, which classifier component 144 may then assign to data flow 103. In one example, which should not be construed as limiting, HTTPS (encrypted HTTP) traffic is associated with port 443 at an HTTP server, and hence flows associated with port 443 may be classified as uncompressed data flows 116. Further, for example, it may be known that traffic to certain addresses are always encrypted, and hence such traffic is not compressible and the corresponding data flow can be classified as uncompressed data flows 116. Additionally, for example, data flows that belong to applications that send incompressible data, and those that belong to applications that send compressible data, may be identified either locally, e.g., via a socket manager, or remotely via a network entity. As such, for instance, one or more data packets 104 belonging to a picture upload application can be known to be incompressible, and hence the corresponding data flow 103 may be classified as uncompressed data flow 116. Also, for example, based on analyzing the one or more data packet 104 or their contents, it may be determined that data flow 103 is carrying HTTP traffic, which may then enable data flow 103 to be classified as compressible data packet flow 114. Moreover, it should be understood that classifier component 144 configured to identify a lack of correlating or matching the determined source information 120 and/or destination information 122 with a known one of compressible data packet flow 114 or uncompressed data packet flow 116, and as a result of not finding a correlation or match to thereby classify data packet flow 103 as an opposite one of compressible data packet flow 114 or uncompressed data packet flow 116.

Optionally, at Block 208, an aspect of method 200 may further include compressing the one or more data packets associated with the data packet flow to produce one or more compressed data packets for transmission when the data packet flow is classified as the compressible data packet flow. For example, in an aspect, compressor component 102 may not strictly compress any received data packet, but instead may be configured to selectively compress data packets based on a classification of a corresponding data flow. For example, in an aspect, compressor component 102 may include compressor 146 configured to execute an algorithm, which may be part of compressor algorithm 106, which operates to communicate with classifier component 144 and compress the one or more data packets 104 of data packet flow 103 when classifier component 144 classifies data flow 103 as compressible data flow 114.

Optionally, at Block 210, an aspect of method 200 may further include skipping the compressing of the one or more data packets associated with the data packet flow based on the classifying of the data packet flow as the uncompressed data packet flow. For example, in an aspect, compressor component 102 may include compressor 146 configured to execute an algorithm, which may be part of compressor algorithm 106, which operates to communicate with classifier component 144 and to skip applying compression to the one or more data packets 104 of data packet flow 103 when classifier component 144 classifies data flow 103 as uncompressed data flow 116.

At Block 212, an aspect of method 200 may further include transmitting the one or more compressed data packets when the data packet flow is classified as the compressible data packet flow, or transmitting the one or more data packets when the data packet flow is classified as the uncompressed data packet flow. For example, in an aspect, compressor component 102 may include an output component 148 configured to execute an algorithm, which may be part of compressor algorithm 106, to send one or more compressed data packet 108 or one or more uncompressed data packets 118, depending on the operation of compressor 146. In one aspect, output component 148 may be an interface to a transmitter component or transceiver of a device, such as UE 124 or wireless serving node 128 or some other entity of network 126, depending on the implementation. Further, in another aspect, outputting component 148 may be the transmitter component or the transceiver of the device, such as UE 124 or wireless serving node 128 or some other entity of network 126, depending on the implementation. As such, output component 148 is configured to at least initiate the transmission of one or more compressed data packet 108 or one or more uncompressed data packets 118 to de-compressor component 110.

Although not illustrated, it should be noted that in some aspects, compression component 102 may be configured to send each of one or more compressed data packet 108 or one or more uncompressed data packets 118 with signaling to indicate whether or not each of the respective data packets is compressed or not compressed. For example, the signaling may be an indicator appended to each data packet, where the indicator is configured to identify a compression state, e.g. compressed or not compressed or a change in compression relative to a prior packet. As such, de-compressor component 110 may receive the one or more compressed data packet 108 or the one or more uncompressed data packets 118, along with the respective signaling, and determine whether or not to apply de-compression algorithm 112 to re-generate the original one or more data packets 104.

Figure 4:
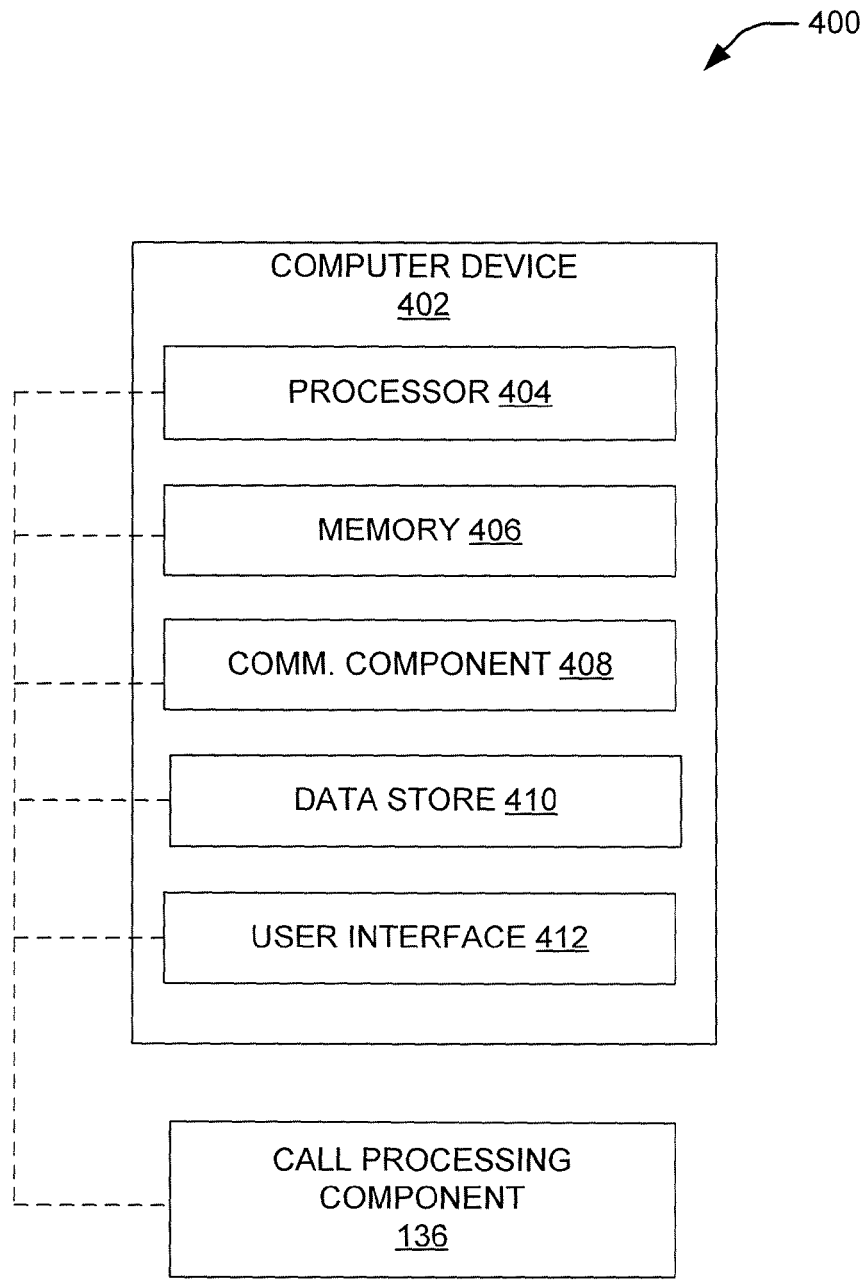
FIG. 4 is a block diagram of an aspect of a specially-programmed computer device including a call processing component according to the present disclosure.

Referring to FIG. 4, a computer system 400, in one aspect, may be a specially programmed or configured computer device 402, wherein the special programming or configuration includes call processing component 136, as described herein. For example, for implementation as UE 124 (FIGS. 1 and 3), computer device 402 may include one or more components for computing and transmitting compressed data packets 108 or uncompressed data packets 118, based on operation of compressor component 102 and classifying of a received data packet flow 103, from UE 124 to network 126 via wireless serving node 128. For instance, call processing component 136 may be implemented in specially programmed computer readable instructions or code, firmware, hardware, or some combination thereof. Computer device 402 includes a processor 404 for carrying out processing functions associated with one or more of components and functions described herein. Processor 404 can include a single or multiple set of processors or multi-core processors. Moreover, processor 404 can be implemented as an integrated processing system and/or a distributed processing system.

Computer device 402 may further include a memory 406, such as for storing data used herein and/or local versions of applications being executed by processor 404, such as call processing component 136. Memory 406 can include any type of memory usable by a computer, such as random access memory (RAM), read only memory (ROM), tapes, magnetic discs, optical discs, volatile memory, non-volatile memory, and any combination thereof.

Further, computer device 402 may include a communications component 408 that provides for establishing and maintaining communications with one or more entities utilizing hardware, software, and services as described herein. For example, communications component 408 may carry communications between components on computer device 402, as well as between computer device 402 and external devices, such as devices located across communications network 126 and/or devices serially or locally connected to computer device 402. For example, communications component 408 may include one or more buses, and may further include transmit chain components and receive chain components associated with a transmitter and receiver, respectively, or a transceiver, operable for interfacing with external devices. For example, in an aspect, a receiver of communications component 408 operates to receive data flow 103 including one or more data packets 104, and to transmit one or more compressed data packets 108 and/or one or more uncompressed data packets 118 to wireless serving node 128 and/or network 126.

Additionally, computer device 402 may further include a data store 410, which can be any suitable combination of hardware and/or software, that provides for mass storage of information, databases, and programs employed in connection with aspects described herein, such as call processing component 136. For example, data store 410 may be a data repository for applications not currently being executed by processor 404.

Computer device 402 may additionally include a user interface component 412 operable to receive inputs from a user of computer device 402, and further operable to generate outputs for presentation to the user. User interface component 412 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 412 may include one or more output devices, including but not limited to a display, a speaker, a haptic feedback mechanism, a printer, any other mechanism capable of presenting an output to a user, or any combination thereof.

Furthermore, computer device 402 or any component of computer device 402 may include, or may be in communication with, call processing component 136, which may be configured to perform the functions described herein.

Figure 5:
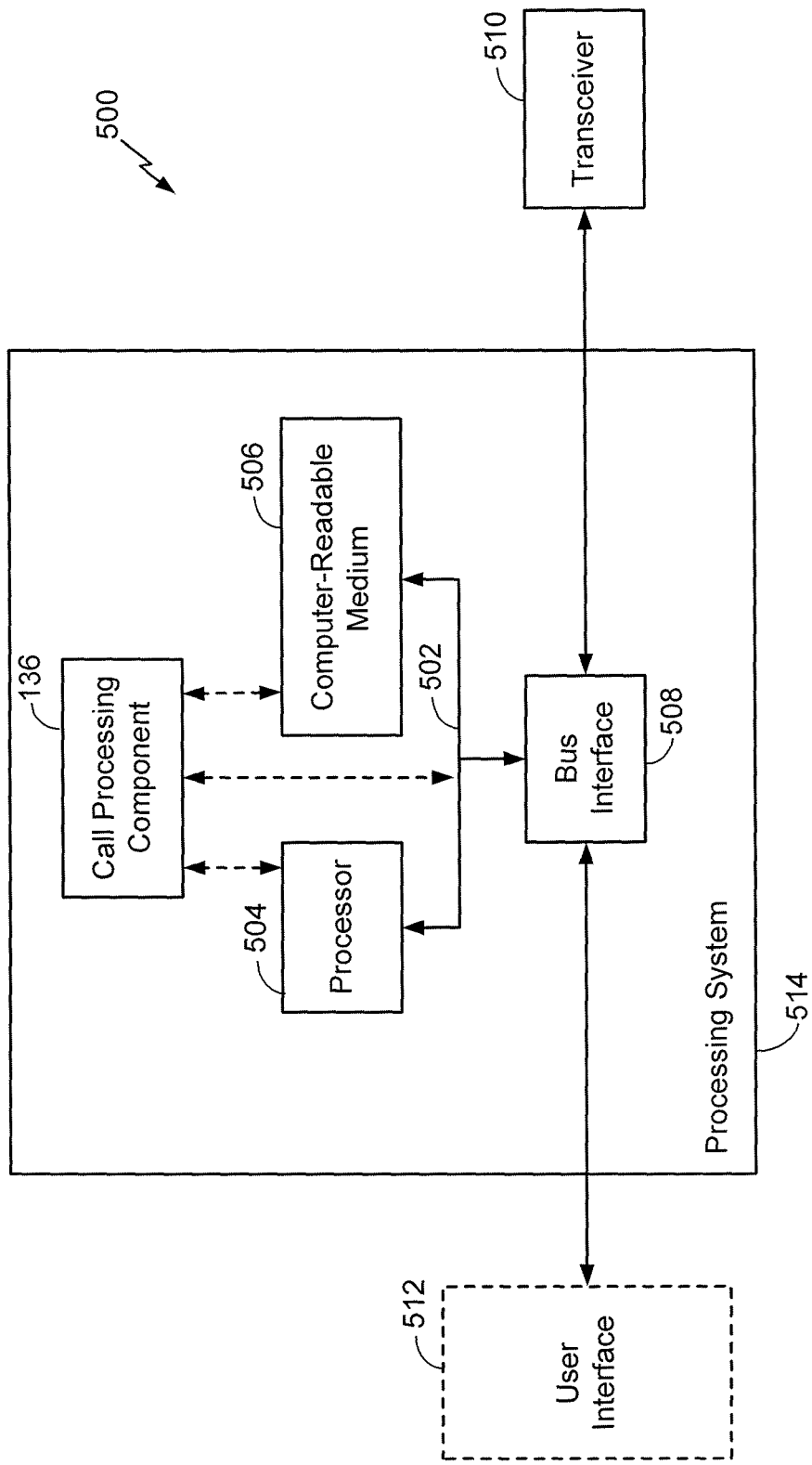
FIG. 5 is a schematic diagram of an aspect of a hardware implementation of a call processing according to the present disclosure.

Referring to FIG. 5, an apparatus 500 may employ a processing system 514 configured to include call processing component 136 as described herein. Apparatus 500 may be configured to be, or to include, for example, UE 124 (FIGS. 1 and 3) and/or wireless serving node 128 or some other entity of network 126 (FIG. 1) implementing the components described above, such as but not limited to call processing component 136. In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, and computer-readable media, represented generally by the computer-readable medium 506. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described infra for any particular apparatus. The computer-readable medium 506 may also be used for storing data that is manipulated by the processor 504 when executing software.

In an aspect, processor 504, computer-readable medium 506, or a combination of both may be configured or otherwise specially programmed to perform the functionality of the call processing component 136 (FIGS. 1-3) as described herein.

The various concepts presented throughout this disclosure may be implemented across a broad variety of telecommunication systems, network architectures, and communication standards.

Figure 6:
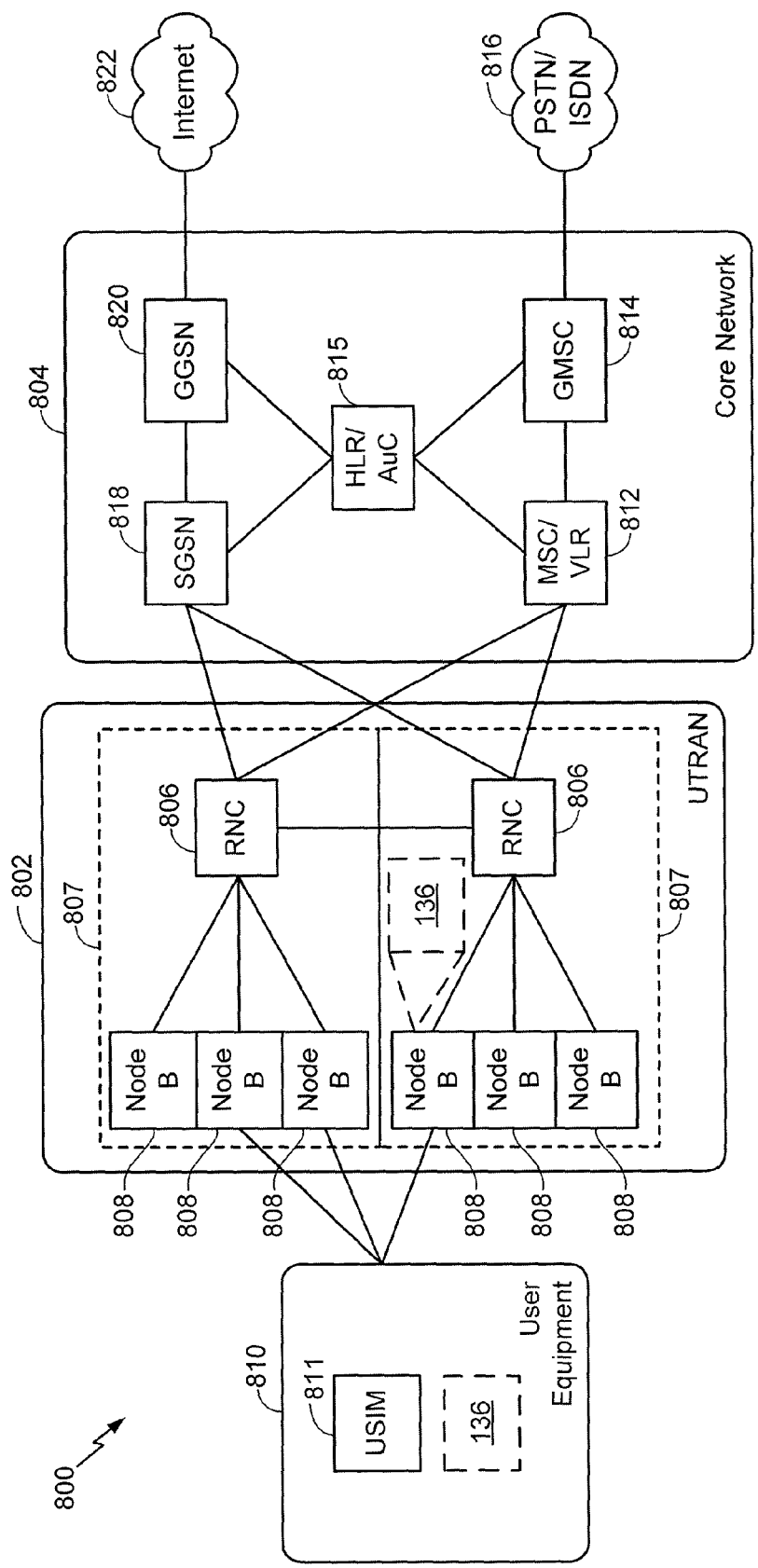
FIG. 6 is a block diagram of an example of a telecommunications system including a UE configured to perform the functions described herein.

Referring to FIG. 6, by way of example and without limitation, the aspects of the present disclosure are presented with reference to a UMTS system 800 employing a W-CDMA air interface, including a UE 810 and/or a Node B 808 configured to include call processing component 136 as described herein. A UMTS network includes three interacting domains: a Core Network (CN) 804, a UMTS Terrestrial Radio Access Network (UTRAN) 802, and User Equipment (UE) 810. In this example, the UTRAN 802 provides various wireless services including telephony, video, data, messaging, broadcasts, and/or other services. The UTRAN 802 may include a plurality of Radio Network Subsystems (RNSs) such as an RNS 807, each controlled by a respective Radio Network Controller (RNC) such as an RNC 806. Here, the UTRAN 802 may include any number of RNCs 806 and RNSs 807 in addition to the RNCs 806 and RNSs 807 illustrated herein. The RNC 806 is an apparatus responsible for, among other things, assigning, reconfiguring and releasing radio resources within the RNS 807. The RNC 806 may be interconnected to other RNCs (not shown) in the UTRAN 802 through various types of interfaces such as a direct physical connection, a virtual network, or the like, using any suitable transport network.

Communication between a UE 810 and a Node B 808 may be considered as including a physical (PHY) layer and a medium access control (MAC) layer. Further, communication between a UE 810 and an RNC 806 by way of a respective Node B 808 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 807 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 808 are shown in each RNS 807; however, the RNSs 807 may include any number of wireless Node Bs. The Node Bs 808 provide wireless access points to a CN 804 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 810 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 810 may further include a universal subscriber identity module (USIM) 811, which contains a user's subscription information to a network. For illustrative purposes, one UE 810 is shown in communication with a number of the Node Bs 808. The DL, also called the forward link, refers to the communication link from a Node B 808 to a UE 810, and the UL, also called the reverse link, refers to the communication link from a UE 810 to a Node B 808.

The CN 804 interfaces with one or more access networks, such as the UTRAN 802. As shown, the CN 804 is a GSM core network. However, as those skilled in the art will recognize, the various concepts presented throughout this disclosure may be implemented in a RAN, or other suitable access network, to provide UEs with access to types of CNs other than GSM networks.

The CN 804 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 804 supports circuit-switched services with a MSC 812 and a GMSC 814. In some applications, the GMSC 814 may be referred to as a media gateway (MGW). One or more RNCs, such as the RNC 806, may be connected to the MSC 812. The MSC 812 is an apparatus that controls call setup, call routing, and UE mobility functions. The MSC 812 also includes a VLR that contains subscriber-related information for the duration that a UE is in the coverage area of the MSC 812. The GMSC 814 provides a gateway through the MSC 812 for the UE to access a circuit-switched network 816. The GMSC 814 includes a home location register (HLR) 815 containing subscriber data, such as the data reflecting the details of the services to which a particular user has subscribed. The HLR is also associated with an authentication center (AuC) that contains subscriber-specific authentication data. When a call is received for a particular UE, the GMSC 814 queries the HLR 815 to determine the UE's location and forwards the call to the particular MSC serving that location.

The CN 804 also supports packet-data services with a serving GPRS support node (SGSN) 818 and a gateway GPRS support node (GGSN) 820. GPRS, which stands for General Packet Radio Service, is designed to provide packet-data services at speeds higher than those available with standard circuit-switched data services. The GGSN 820 provides a connection for the UTRAN 802 to a packet-based network 822. The packet-based network 822 may be the Internet, a private data network, or some other suitable packet-based network. The primary function of the GGSN 820 is to provide the UEs 810 with packet-based network connectivity. Data packets may be transferred between the GGSN 820 and the UEs 810 through the SGSN 818, which performs primarily the same functions in the packet-based domain as the MSC 812 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 808 and a UE 810. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 810 provides feedback to the node B 808 over the HS-DPCCH to indicate whether it correctly decoded a packet on the downlink.

HS-DPCCH further includes feedback signaling from the UE 810 to assist the node B 808 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 808 and/or the UE 810 may have multiple antennas supporting MIMO technology. The use of MIMO technology enables the node B 808 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 810 to increase the data rate, or to multiple UEs 810 to increase the overall system capacity. This is achieved by spatially precoding each data stream and then transmitting each spatially precoded stream through a different transmit antenna on the downlink. The spatially precoded data streams arrive at the UE(s) 810 with different spatial signatures, which enables each of the UE(s) 810 to recover the one or more the data streams destined for that UE 810. On the uplink, each UE 810 may transmit one or more spatially precoded data streams, which enables the node B 808 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
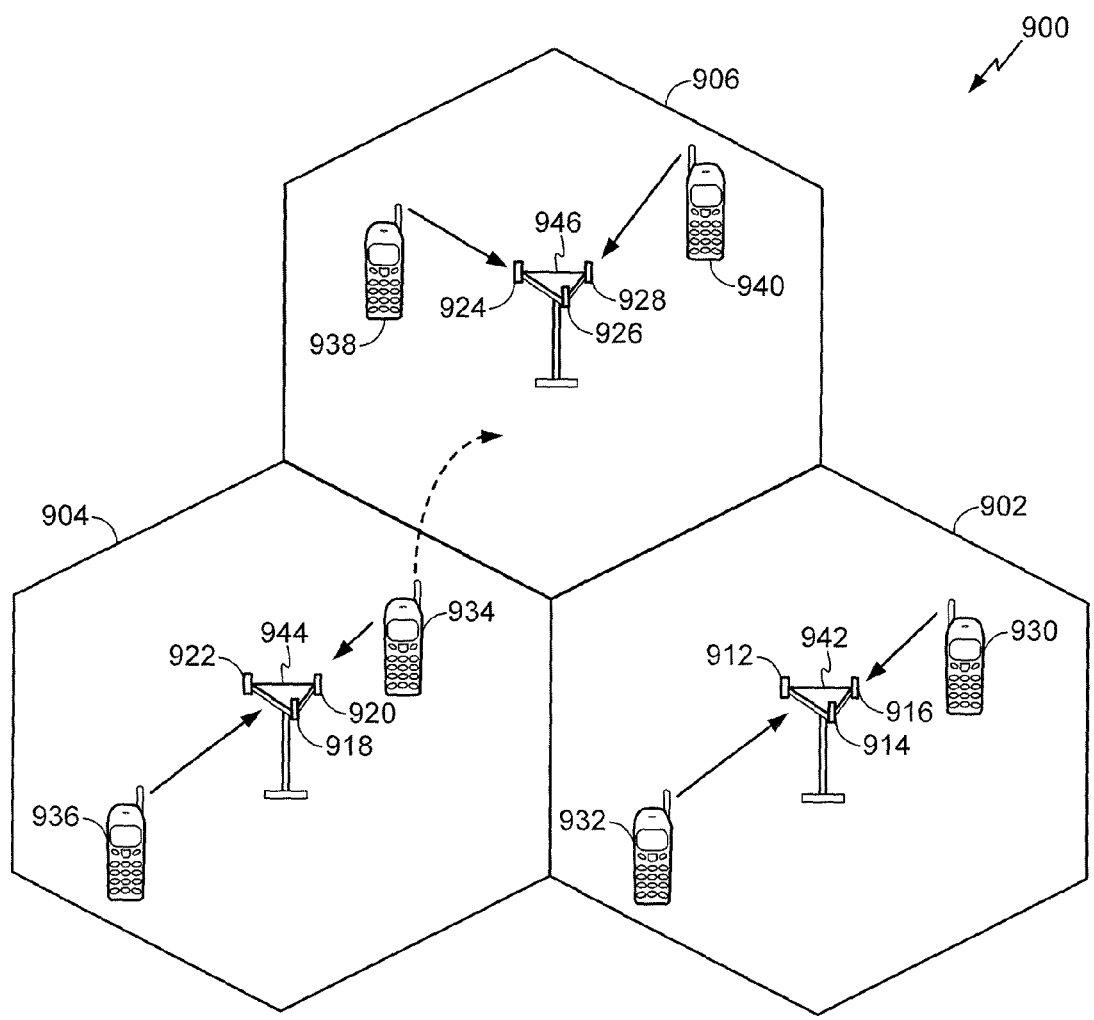
FIG. 7 is a schematic diagram of an example of an access network for use with a UE configured to perform the functions described herein.

Referring to FIG. 7, an access network 900 in a UTRAN architecture is illustrated and includes UEs and/or Node Bs configured with call processing component 136 as described herein. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 may include several wireless communication devices, e.g., User Equipment or UEs, which may be in communication with one or more sectors of each cell 902, 904 or 906. For example, UEs 930 and 932 may be in communication with Node B 942, UEs 934 and 936 may be in communication with Node B 944, and UEs 938 and 940 can be in communication with Node B 946. Here, each Node B 942, 944, 946 is configured to provide an access point to a CN 804 for all the UEs 930, 932, 934, 936, 938, 940 in the respective cells 902, 904, and 906. As noted above, Node Bs 942, 944, 946 and UEs 930, 932, 934, 936, 938, 940 respectively may be configured to include, for example, the call processing component 136 (FIGS. 1 and 3) implementing the components described above.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a radio network controller 806 (see FIG. 8), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
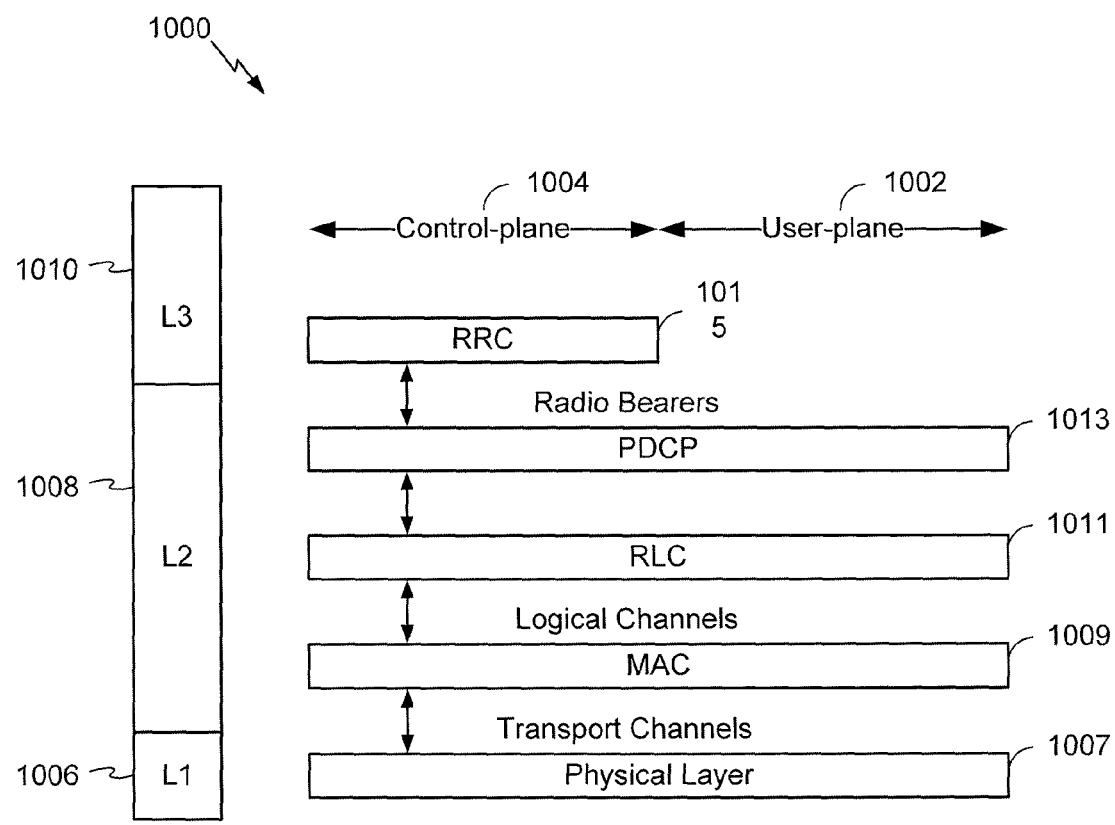
FIG. 8 is a schematic diagram of an example of a radio protocol architecture for the user and control planes for a base station and/or a UE configured to perform the functions described herein.

Referring to FIG. 8, an example radio protocol architecture 1000 may be implemented for the user plane 1002 and the control plane 1004 of a user equipment (UE) or node B/base station. For example, architecture 1000 may be included in a network entity and/or UE, such as an entity within wireless network 126 and/or UE 124 (FIGS. 1 and 3), configured with call processing component 136 as described herein. The radio protocol architecture 1000 for the UE and node B is shown with three layers: Layer 1 1006, Layer 2 1008, and Layer 3 1010. Layer 1 1006 is the lowest lower and implements various physical layer signal processing functions. As such, Layer 1 (L1 layer) 1006 includes the physical layer 1007. Layer 2 (L2 layer) 1008 is above the physical layer 1007 and is responsible for the link between the UE and node B over the physical layer 1007. Layer 3 (L3 layer) 1010 includes a radio resource control (RRC) sublayer 1015. The RRC sublayer 1015 handles the control plane signaling of Layer 3 between the UE and the UTRAN.

In the user plane, the L2 layer 1008 includes a media access control (MAC) sublayer 1009, a radio link control (RLC) sublayer 1011, and a packet data convergence protocol (PDCP) 1013 sublayer, which are terminated at the node B on the network side. Although not shown, the UE may have several upper layers above the L2 layer 1008 including a network layer (e.g., IP layer) that is terminated at a PDN gateway on the network side, and an application layer that is terminated at the other end of the connection (e.g., far end UE, server, etc.).

The PDCP sublayer 1013 provides multiplexing between different radio bearers and logical channels. The PDCP sublayer 1013 also provides header compression for upper layer data packets to reduce radio transmission overhead, security by ciphering the data packets, and handover support for UEs between node Bs. The RLC sublayer 1011 provides segmentation and reassembly of upper layer data packets, retransmission of lost data packets, and reordering of data packets to compensate for out-of-order reception due to hybrid automatic repeat request (HARQ). The MAC sublayer 1009 provides multiplexing between logical and transport channels. The MAC sublayer 1009 is also responsible for allocating the various radio resources (e.g., resource blocks) in one cell among the UEs. The MAC sublayer 1009 is also responsible for HARQ operations.

Figure 9:
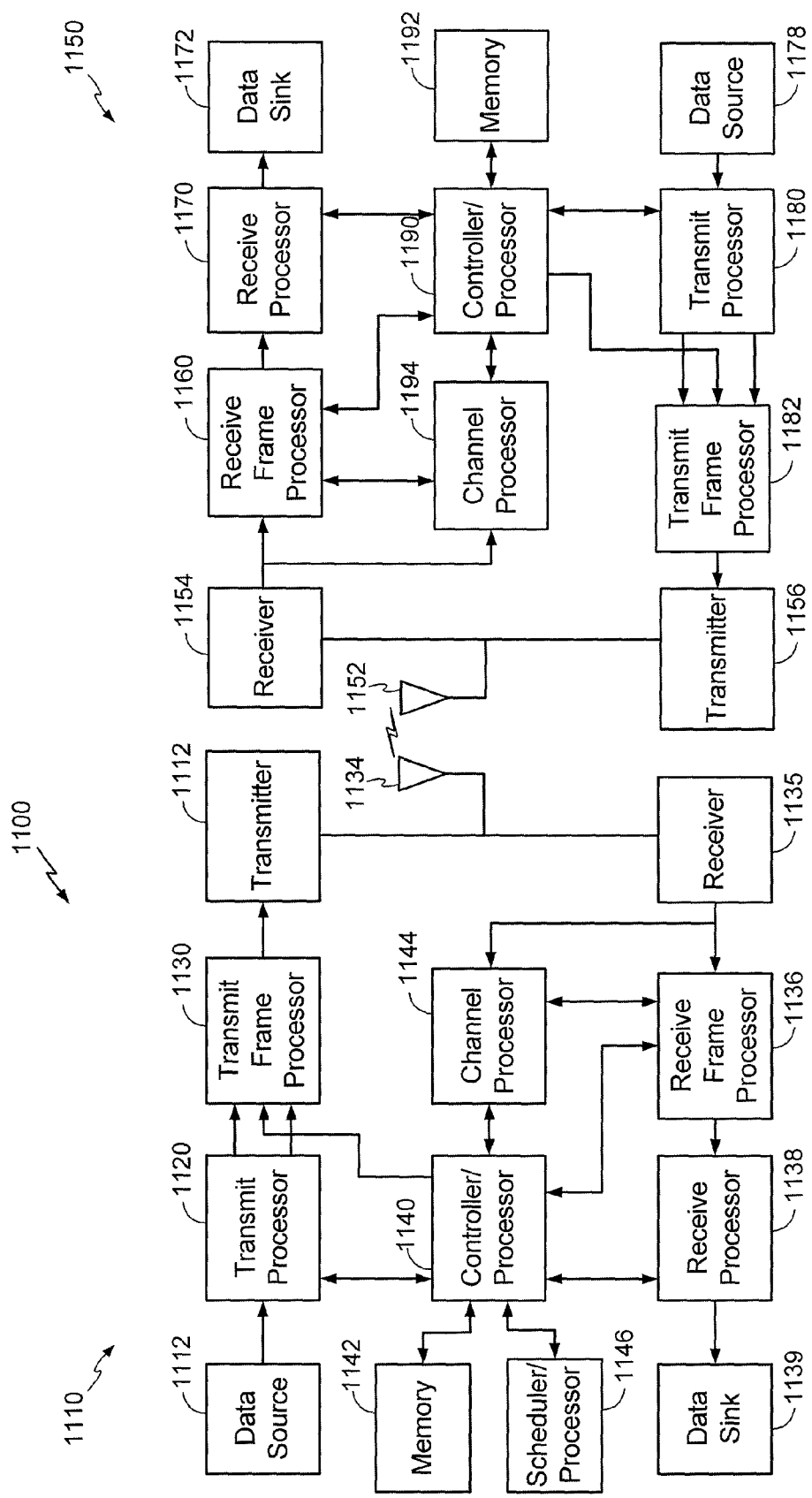
FIG. 9 is a block diagram of an example of a Node B in communication with a UE in a telecommunications system, where the UE and/or Node B may be configured to perform the functions described herein.

Referring to FIG. 9, an example communication system 1100 includes a Node B 1110 in communication with a UE 1150, where Node B 1110 may be an entity within network 126 and the UE 1150 may be UE 124 according to the aspects described in FIGS. 1 and 3, where either or both may include call processing component 136 as described herein. In the downlink communication, a transmit processor 1120 may receive data from a data source 1112 and control signals from a controller/processor 1140. The transmit processor 1120 provides various signal processing functions for the data and control signals, as well as reference signals (e.g., pilot signals). For example, the transmit processor 1120 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1144 may be used by a controller/processor 1140 to determine the coding, modulation, spreading, and/or scrambling schemes for the transmit processor 1120. These channel estimates may be derived from a reference signal transmitted by the UE 1150 or from feedback from the UE 1150. The symbols generated by the transmit processor 1120 are provided to a transmit frame processor 1130 to create a frame structure. The transmit frame processor 1130 creates this frame structure by multiplexing the symbols with information from the controller/processor 1140, resulting in a series of frames. The frames are then provided to a transmitter 1132, which provides various signal conditioning functions including amplifying, filtering, and modulating the frames onto a carrier for downlink transmission over the wireless medium through antenna 1134. The antenna 1134 may include one or more antennas, for example, including beam steering bidirectional adaptive antenna arrays or other similar beam technologies.

At the UE 1150, a receiver 1154 receives the downlink transmission through an antenna 1152 and processes the transmission to recover the information modulated onto the carrier. The information recovered by the receiver 1154 is provided to a receive frame processor 1160, which parses each frame, and provides information from the frames to a channel processor 1194 and the data, control, and reference signals to a receive processor 1170. The receive processor 1170 then performs the inverse of the processing performed by the transmit processor 1120 in the Node B 1110. More specifically, the receive processor 1170 descrambles and despreads the symbols, and then determines the most likely signal constellation points transmitted by the Node B 1110 based on the modulation scheme. These soft decisions may be based on channel estimates computed by the channel processor 1194. The soft decisions are then decoded and deinterleaved to recover the data, control, and reference signals. The CRC codes are then checked to determine whether the frames were successfully decoded. The data carried by the successfully decoded frames will then be provided to a data sink 1172, which represents applications running in the UE 1150 and/or various user interfaces (e.g., display). Control signals carried by successfully decoded frames will be provided to a controller/processor 1190. When frames are unsuccessfully decoded by the receiver processor 1170, the controller/processor 1190 may also use an acknowledgement (ACK) and/or negative acknowledgement (NACK) protocol to support retransmission requests for those frames.

In the uplink, data from a data source 1178 and control signals from the controller/processor 1190 are provided to a transmit processor 1180. The data source 1178 may represent applications running in the UE 1150 and various user interfaces (e.g., keyboard). Similar to the functionality described in connection with the downlink transmission by the Node B 1110, the transmit processor 1180 provides various signal processing functions including CRC codes, coding and interleaving to facilitate FEC, mapping to signal constellations, spreading with OVSFs, and scrambling to produce a series of symbols. Channel estimates, derived by the channel processor 1194 from a reference signal transmitted by the Node B 1110 or from feedback contained in the midamble transmitted by the Node B 1110, may be used to select the appropriate coding, modulation, spreading, and/or scrambling schemes. The symbols produced by the transmit processor 1180 will be provided to a transmit frame processor 1182 to create a frame structure. The transmit frame processor 1182 creates this frame structure by multiplexing the symbols with information from the controller/processor 1190, resulting in a series of frames. The frames are then provided to a transmitter 1156, which provides various signal conditioning functions including amplification, filtering, and modulating the frames onto a carrier for uplink transmission over the wireless medium through the antenna 1152.

The uplink transmission is processed at the Node B 1110 in a manner similar to that described in connection with the receiver function at the UE 1150. A receiver 1135 receives the uplink transmission through the antenna 1134 and processes the transmission to recover the information modulated onto the carrier. The information recovered by the receiver 1135 is provided to a receive frame processor 1136, which parses each frame, and provides information from the frames to the channel processor 1144 and the data, control, and reference signals to a receive processor 1138. The receive processor 1138 performs the inverse of the processing performed by the transmit processor 1180 in the UE 1150. The data and control signals carried by the successfully decoded frames may then be provided to a data sink 1139 and the controller/processor, respectively. If some of the frames were unsuccessfully decoded by the receive processor, the controller/processor 1140 may also use an acknowledgement (ACK) and/or negative acknowledgement (NACK) protocol to support retransmission requests for those frames.

The controller/processors 1140 and 1190 may be used to direct the operation at the Node B 1110 and the UE 1150, respectively. For example, the controller/processors 1140 and 1190 may provide various functions including timing, peripheral interfaces, voltage regulation, power management, and other control functions. The computer readable media of memories 1142 and 1192 may store data and software for the Node B 1110 and the UE 1150, respectively. A scheduler/processor 1146 at the Node B 1110 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 5 or 6) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean-instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706 (FIG. 6). The computer-readable medium 706 (FIG. 6) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving, at a compressor component, a data packet flow;
   determining information associated with the data packet flow from one or more data packets associated with the data packet flow, wherein the determined information comprises source information or destination information corresponding to the one or more data packets of the data packet flow;
   analyzing the one or more data packets to at least one of determine a packet characteristic identifying or identify data at a certain position within a packet content of the one or more data packets;
   classifying the data packet flow as a compressible data packet flow or an uncompressed data packet flow based on the determined information and at least one of determining the packet characteristic corresponds to an application or determining the identified data matches a known type corresponding to compressible traffic;
   compressing the one or more data packets associated with the data packet flow to produce one or more compressed data packets for transmission when the data packet flow is classified as the compressible data packet flow; and
   transmitting the one or more compressed data packets when the data packet flow is classified as the compressible data packet flow or transmitting the one or more data packets when the data packet flow is classified as the uncompressed data packet flow.

2. The method of claim 1, wherein the determining information associated with the data packet flow comprises determining at least one of a source port or a destination port, wherein the classifying further comprises classifying the data packet flow as the compressible data flow based on the at least one of the source port or the destination port corresponding to a port that carries compressible data, and wherein the classifying further comprises classifying the data packet flow as the uncompressed data flow based on the at least one of the source port or the destination port corresponding to a port that carries data not to be compressed.

3. The method of claim 1, wherein the determining information associated with the data packet flow comprises determining at least one of a source address or a destination address, wherein the classifying further comprises classifying the data packet flow as the compressible data flow based on the at least one of the source address or the destination address corresponding to an address that carries compressible data, and wherein the classifying further comprises classifying the data packet flow as the uncompressed data flow based on the at least one of the source address or the destination address corresponding to an address associated with data not to be compressed.

4. The method of claim 1, further comprising:
   identifying an application associated with the data packet flow based on the determining information comprising determining the source information or the destination information of the one or more data packets corresponding to the application;
   identifying the application as being associated with sending or receiving compressible data or with data not to be compressed; and
   wherein the classifying further comprises classifying the data packet flow as the compressible data flow based on the application being associated with sending or receiving compressible data, and wherein the classifying further comprises classifying the data packet flow as the uncompressed data flow based on the application being associated with sending or receiving data not to be compressed.

5. The method of claim 4, wherein the identifying of the application being associated with the data packet flow further comprises receiving an identification of the application as corresponding to the data packet flow.

6. The method of claim 4, wherein the identifying of the application being associated with the data packet flow further comprises
   determining that the packet characteristic corresponds to the application.

7. The method of claim 6, wherein the analyzing the one or more data packets further comprises analyzing a content of the one or more data packets.

8. The method of claim 1, wherein the determining information associated with the data packet flow further comprises:
   analyzing the one or more data packets to determine a packet characteristic;
   determining the packet characteristic as being associated with sending or receiving compressible data or data not to be compressed; and
   wherein the classifying further comprises classifying the data packet flow as the compressible data flow based on the packet characteristic being associated with sending or receiving compressible data, and wherein the classifying further comprises classifying the data packet flow as the uncompressed data flow based on the packet characteristic being associated with sending or receiving data not to be compressed.

9. The method of claim 1, further comprising:
   wherein the classifying further comprises classifying the data packet flow as the compressible data packet flow based on the determined information; and
   wherein the transmitting comprises transmitting the one or more compressed data packets.

10. The method of claim 1, further comprising:
    wherein the classifying further comprises classifying the data packet flow as the uncompressed data packet flow based on the determined information;
    skipping the compressing of the one or more data packets associated with the data packet flow based on the classifying of the data packet flow as the uncompressed data packet flow; and
    wherein the transmitting comprises transmitting the one or more data packets.

11. An apparatus of wireless communication, comprising:
    a compressor component, including:
    a receiver component configured to receive a data packet flow;
    a flow information determiner component configured to determine information associated with the data packet flow from one or more data packets associated with the data packet flow, wherein the determined information comprises source information or destination information corresponding to the one or more data packets of the data packet flow,
    wherein the flow information determiner component is further configured to analyze the one or more data packets to at least one of determine a packet characteristic or identify data at a certain position within a packet content of the one or more data packets;

a classifier component configured to classify the data packet flow as a compressible data packet flow or an uncompressed data packet flow based on the determined information and at least one of determining the packet characteristic corresponds to an application or determining the identified data matches a known type corresponding to compressible traffic;

a compressor configured to compress the one or more data packets associated with the data packet flow to produce one or more compressed data packets for transmission when the data packet flow is classified as the compressible data packet flow; and an output component configured to transmit the one or more compressed data packets when the data packet flow is classified as the compressible data packet flow or transmitting the one or more data packets when the data packet flow is classified as the uncompressed data packet flow.

12. The apparatus of claim 11, wherein the flow information determiner component is further configured to determine at least one of a source port or a destination port, wherein the classifier component is further configured to classify the data packet flow as the compressible data flow based on the at least one of the source port or the destination port corresponding to a port that carries compressible data, and wherein the classifier component is further configured to classify the data packet flow as the uncompressed data flow based on the at least one of the source port or the destination port corresponding to a port that carries data not to be compressed.

13. The apparatus of claim 11, wherein the determined information associated with the data packet flow comprises at least one of a source address or a destination address, wherein the classifier component is further configured to classify the data packet flow as the compressible data flow based on the at least one of the source address or the destination address corresponding to an address that carries compressible data, and wherein the classifier component is further configured to classify the data packet flow as the uncompressed data flow based on the at least one of the source address or the destination address corresponding to an address associated with data not to be compressed.

14. The apparatus of claim 11, wherein the classifier component is further configured to:
identify an application associated with the data packet flow based on the determining information comprising determining the source information or the destination information of the one or more data packets corresponding to the application;
identify the application as being associated with sending or receiving compressible data or with data not to be compressed; and
classify the data packet flow as the compressible data flow based on the application being associated with sending or receiving compressible data, and classify the data packet flow as the uncompressed data flow based on the application being associated with sending or receiving data not to be compressed.

15. The apparatus of claim 14, wherein to identify the application being associated with the data packet flow, the classifier component is further configured to receive an identification of the application as corresponding to the data packet flow.

16. The apparatus of claim 14, wherein to identify the application being associated with the data packet flow, the classifier component is further configured to determine that the packet characteristic corresponds to the application.

17. The apparatus of claim 16, wherein the classifier component is further configured to analyze a content of the one or more data packets.

18. The apparatus of claim 11, wherein the flow information determiner component is further configured to analyze the one or more data packets to determine a packet characteristic, and determine the packet characteristic as being associated with sending or receiving compressible data or data not to be compressed, and wherein the classifier component is further configured to classify the data packet flow as the compressible data flow based on the packet characteristic being associated with sending or receiving compressible data, and wherein the classifier component is further configured to classify the data packet flow as the uncompressed data flow based on the packet characteristic being associated with sending or receiving data not to be compressed.

19. The apparatus of claim 11, wherein the classifier component is further configured to classify the data packet flow as the compressible data packet flow based on the determined information, and wherein the output component is further configured to transmit the one or more compressed data packets.

20. The apparatus of claim 11, wherein the classifier component is further configured to classify the data packet flow as the uncompressed data packet flow based on the determined information, wherein the compressor is further configured to skip compressing of the one or more data packets associated with the data packet flow based on the classifying of the data packet flow as the uncompressed data packet flow, and wherein the output component is further configured to transmit the one or more data packets.

21. An apparatus including a compressor component for wireless communication, comprising:
means for receiving a data packet flow;
means for determining information associated with the data packet flow from one or more data packets associated with the data packet flow, wherein the determined information comprises source information or destination information corresponding to the one or more data packets of the data packet flow;
means for analyzing the one or more data packets to at least one of determine a packet characteristic or identify data at a certain position within a packet content of the one or more data packets;
means for classifying the data packet flow as a compressible data packet flow or an uncompressed data packet flow based on the determined information and at least one of determining the packet characteristic corresponds to an application or determining the identified data matches a known type corresponding to compressible traffic;
means for compressing the one or more data packets associated with the data packet flow to produce one or more compressed data packets for transmission when the data packet flow is classified as the compressible data packet flow; and
means for transmitting the one or more compressed data packets when the data packet flow is classified as the compressible data packet flow or transmitting the one or more data packets when the data packet flow is classified as the uncompressed data packet flow.

22. A non-transitory computer readable medium, comprising:
code executable by a computer for receiving, at a compressor component, a data packet flow;

code executable by the computer for determining information associated with the data packet flow from one or more data packets associated with the data packet flow, wherein the determined information comprises source information or destination information corresponding to the one or more data packets of the data packet flow;

code executable by the computer for analyzing the one or more data packets to at least one of determine a packet characteristic or identify data at a certain position within a packet content of the one or more data packets;

code executable by the computer for classifying the data packet flow as a compressible data packet flow or an uncompressed data packet flow based on the determined information and at least one of determining the packet characteristic corresponds to an application or determining the identified data matches a known type corresponding to compressible traffic;

code executable by the computer for compressing the one or more data packets associated with the data packet flow to produce one or more compressed data packets for transmission when the data packet flow is classified as the compressible data packet flow; and code executable by the computer for transmitting the one or more compressed data packets when the data packet flow is classified as the compressible data packet flow or transmitting the one or more data packets when the data packet flow is classified as the uncompressed data packet flow.

* * * * *